UNITED STATES PATENT OFFICE.

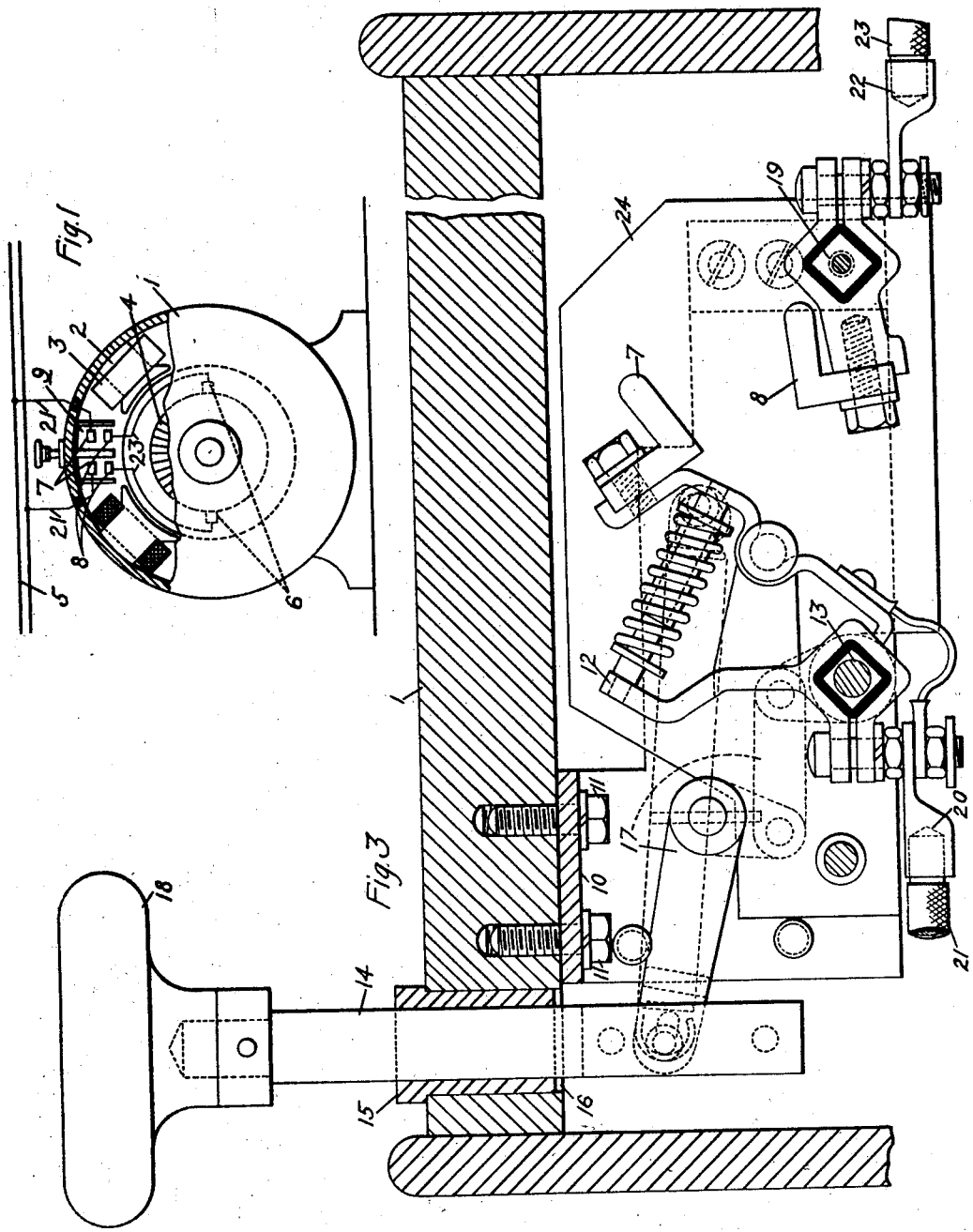

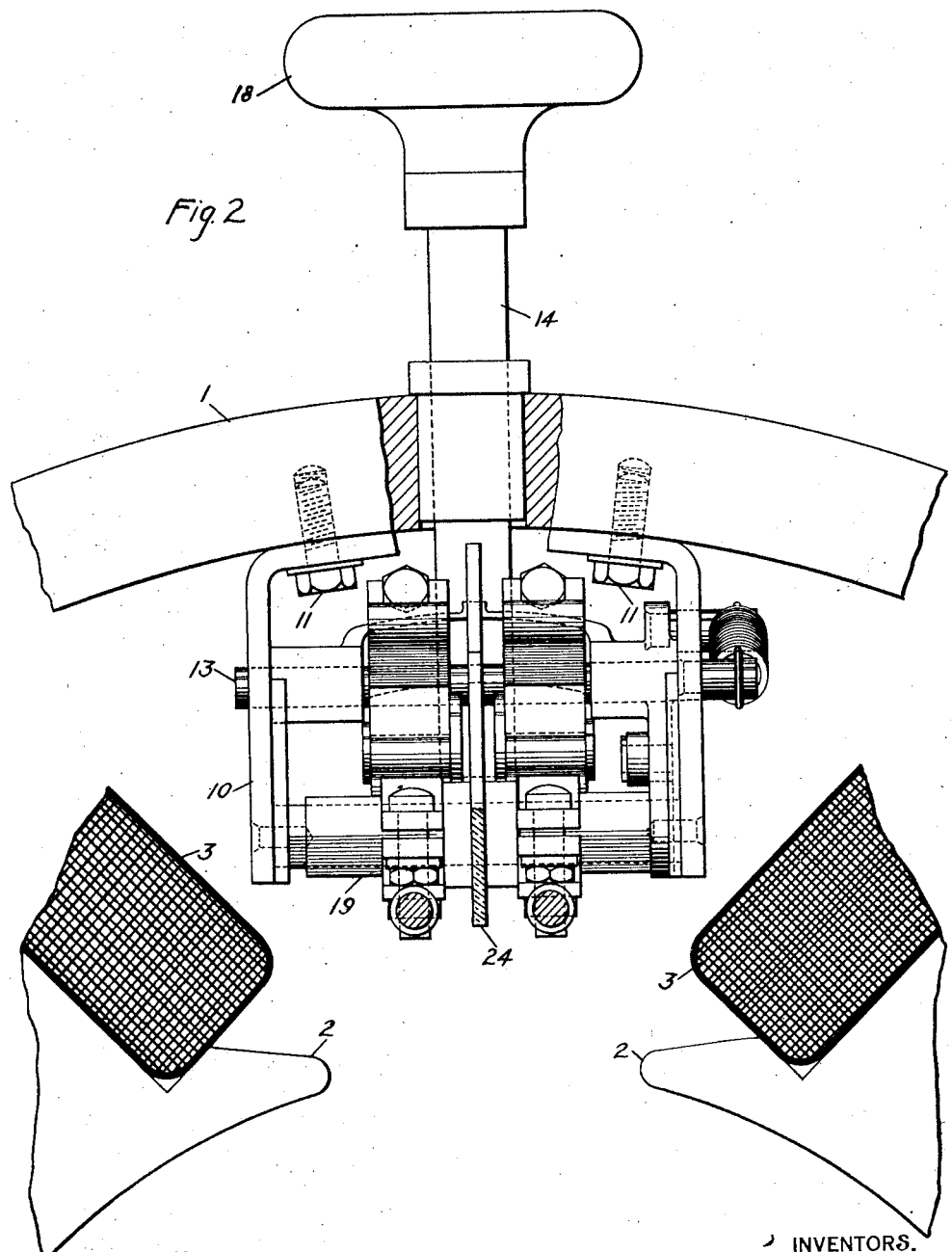

CHARLES W. STARKER AND CHARLES H. HODGKINS, OF PITTSBURGH, PENNSYLVANIA, ASSIGNORS TO WESTINGHOUSE ELECTRIC & MANUFACTURING COMPANY, A CORPORATION OF PENNSYLVANIA.

CONTROL DEVICE FOR EXPLOSION-PROOF ELECTRICAL APPARATUS.

1,347,879.  Specification of Letters Patent.  Patented July 27, 1920.

Application filed February 8, 1918. Serial No. 216,105.

*To all whom it may concern:*

Be it known that we, CHARLES W. STARKER, a citizen of the German Empire, and a resident of Pittsburgh, in the county of Allegheny and State of Pennsylvania, and CHARLES H. HODGKINS, a subject of the King of Great Britain, and a resident of Pittsburgh, in the county of Allegheny and State of Pennsylvania, have invented a new and useful Improvement in Control Devices for Explosion-Proof Electrical Apparatus, of which the following is a specification.

Our invention relates to control devices for electrical apparatus, such as electrical motors or generators that are operated in coal mines, tunnels, submarine boats or in similar locations where readily inflammable mixtures of explosive gases, gasolene vapors, etc., are present and are therefore provided with explosion-proof inclosing casings.

The object of our invention is to provide an electric motor embodying an explosion-proof casing with a control device by means of which the motor may be safely operated.

Copending application, Serial No. 117,778, filed August 30, 1916, by Charles W. Starker, and assigned to the Westinghouse Electric & Manufacturing Company, specifies an electrical motor provided with an inclosing casing in which is embodied an explosion-proof device that permits ignition of an inflammable gas within the casing without allowing any of the burning gas to escape from the casing and, at the same time, relieving the gas pressure within the casing following an explosion.

It has also been customary to inclose control apparatus in similar explosion-proof casings, but, as such casings are relatively expensive to manufacture, we propose to provide a novel form of control device which may be located within the casing of a motor and safely operated from a point outside the motor. Furthermore, we propose to so locate the control device within the explosive-proof casing that magnetic lines of force traversing the motor will exercise a blow-out effect and tend to extinguish arcs that may occur between the relatively movable contact members of the device when it is operated.

In the accompanying drawings, Figure 1 is a diagrammatic view of an electric motor embodying our invention, together with supply and control circuits. Fig. 2 is an enlarged view of a portion of the motor shown in Fig. 1, showing the details of our control device, and Fig. 3 is a view, in side elevation, of the parts shown in Fig. 2.

In the drawings, an electric motor is shown as provided with an inclosing casing 1 that is preferably of the explosion-proof type, such as is described in the above mentioned copending application. The motor comprises a plurality of polar projections 2, located within the casing 1 and provided with field-magnet windings 3, and a current-collecting device 4 that is connected to a suitable source 5 of electric energy through brushes 6 and relatively movable pairs of contact members 7—7 and 8—8 of a control device or switch 9.

As best shown in Figs. 2 and 3, the switch 9 comprises a supporting frame 10 of U-shape that is secured to the peripheral portion of the casing 1 between adjacent polar projections 2, by means of bolts 11. The movable contact members 7 are carried by arms 12 that are disposed in side-by-side relation upon a shaft 13 which is rotatably supported by the arms of the frame 10. An operating rod 14 is slidably mounted in a bushing 15 that is located in an opening 16 with which the casing 1 is provided. One end of the rod 14 is located within the casing and is connected to the shaft 13 by means of a plurality of levers 17 so that a longitudinal movement of the rod 14 causes a rotative movement of the shaft 13. The other end of the rod 14 projects beyond the casing 1 and is provided with an operating handle 18, by means of which a longitudinal movement is imparted to the rod 14. The stationary contact members 8 are mounted, in side-by-side relation, on a fixed shaft 19 that is carried, at its ends, by the arms of the frame 10.

The contact members 7 are connected to the source 5 by means of terminal members 20 and conductors 21, and the contact members 8 are connected to the brushes 6 by means of terminal members 22, conductors 23, as indicated in Figs. 1 and 2. The pairs of contact members 7 and 8 are separated by a barrier 24 of insulating material.

From the foregoing it is apparent that the switch 9 may readily be operated from a point outside of the inclosing casing 1 of the motor so that the circuit between sources of energy and the motor may be completely interrupted without danger of arcs occurring between the contact members to ignite gases that might be present in the atmosphere outside of the casing. Furthermore the intensity and duration of arcs occurring between the contact members 7 and 8 will be held within safe limits, because the magnetic lines of force traversing the space between adjacent polar projections 2 will tend to extinguish such arcs as may occur.

While we have shown our invention in a simple and preferred form it is not limited to the specific details of the switch structure or of the motor but is capable of modification, and we desire, therefore, that only such limitations shall be imposed thereon as may come within the scope of the appended claims.

We claim as our invention:

1. The combination with an electric motor comprising a plurality of polar projections and field-magnet windings therefor, of an electric switch located between adjacent polar projections.

2. The combination with an electric motor comprising a plurality of polar projections and provided with an inclosing casing, of an electrical snap switch connected to control said motor and mounted on the inner periphery of said casing intermediate adjacent polar projections.

3. The combination with an electric motor comprising a plurality of polar projections and provided with a substantially closed casing, of an electrical switch connected to control said motor and disposed in the magnetic field of said polar projections, and means for actuating said switch comprising a member slidably mounted in a substantially air-tight bushing in said casing.

4. The combination with an electric motor comprising a plurality of polar projections and provided with a substantially closed casing, of an electrical snap switch connected to control said motor and mounted on the inner periphery of said casing intermediate said polar projections, and means for actuating said switch comprising a rod extending through a substantially air-tight bushing in said casing in a radial direction and movable longitudinally of itself.

In testimony whereof we have hereunto subscribed our names this 2nd day of Feb., 1918.

CHARLES W. STARKER.
CHARLES H. HODGKINS.